Patented July 20, 1948

2,445,654

UNITED STATES PATENT OFFICE 2,445,654

PROCESS FOR THE RECOVERY OF PARA-COUMARONE TYPE RESINS FROM POLYMERIZED RESIN OILS

Harry L. Allen and Herbert G. Kleinguenther, Philadelphia, Pa., assignors to Allied Chemical & Dye Corporation, New York, N. Y., a corporation of New York No Drawing. Application September 11, 1946, Serial No. 696,345

6 Claims. (Cl. 260—81)

This invention relates to resins and in particular to an improved process for the production of resins. The invention pertains especially to the production of resins of the paracoumarone type, including commercial paracoumarone, which resins may contain in addition to polymerized indene, polymers of indene homologs, coumarone and its homologs and the polymers or copolymers of other resin-forming constituents such as cyclopentadiene, styrene and styrene homologs present in oils used for the production of paracoumarone resins. The invention is of particular importance in the production of resins containing polymers of styrene or styrene homologs.

In the commercial production of paracoumarone resins, suitable oil fractions containing resin-forming constituents, including styrene or its homologs obtained by distillation of coal tar, water-gas tar and drip oil (the oil which settles out in manufactured gas distribution mains and holders or which is scrubbed from manufactured gas during its recovery) are polymerized under controlled conditions with a suitable polymerization catalyst, usually an acid-type catalyst, such as concentrated sulfuric acid. When the polymerization reaction is complete, the acid sludge is separated from the polymerized oil containing from 10 to 30% polymerized materials, the oil is neutralized with an aqueous alkaline solution, such as caustic soda or soda ash solution, and then distilled, usually with the aid of steam, to recover a refined oil as distillate and paracoumarone resin as still residue. The oil may be washed with water prior to the distillation step. During the distillation step there takes place a break-down or decomposition of various thermally unstable impurities introduced into the oil during its processing for resin production, particularly when oils derived from drip oil or water-gas tar are used as raw materials. These impurities may be materials such as organic sulfates and related compounds formed during the polymerization step or in the previous processing of the oils and not completely removed during the subsequent neutralization and washing steps. As a result of these decomposition reactions, darkening of the paracoumarone resin occurs during the recovery step. In many cases the above-mentioned decomposition reactions introduce into the resin odorous constituents which are highly undesirable when it is sought to produce a resin of pleasant odor. In addition to the deleterious effect upon the resin itself the decomposition reactions result in the liberation of acidic materials which have a severe corrosive effect upon the still and other parts of the distillation and condensation apparatus, particularly when steam is used, as is frequently the case.

It is an object of this invention to provide an improved process for the production of catalytically-polymerized resins.

It is a further object of this invention to provide an improved process for the production of catalytically-polymerized paracoumarone resins.

It is a still further object of the invention to provide an improved method for the distillation of catalytically-polymerized resin oils particularly those oils containing styrene or styrene homologs whereby deleterious effects upon equipment and product resulting from thermal decomposition reactions are obviated. Other objects and advantages will appear hereinafter.

In accordance with the invention, polymerized resin oils, obtained by polymerizing a resin oil with sulfuric acid, preferably concentrated sulfuric acid, are heated in the presence of urea or thiourea during or prior to the distillation of the polymerized oil to recover the resin therefrom. The expression "resin oil" is used herein to refer to those oils which contain a substantial content of at least one resin-forming constituent of the group consisting of indene, coumarone, styrene and homologs thereof, such as oils recovered from coal tar and water-gas tar, oils obtained in the coking of coal and in the manufacture of carburetted water gas, including drip oil, collecting in manufactured gas distribution and storage systems or scrubbed from manufactured gas during its recovery.

While the mechanism of the action of urea and thiourea is not fully understood, we have found that heating such acid-polymerized resin oils in the presence of these agents during or prior to distillation is effective in removing the objectionable characteristics of whatever thermal decomposition products may be present after the distillation step. This is evidenced by the absence of acidic materials in the distillate, permitting recovery of an improved resin. As indicated above, our improved process is particularly applicable to the distillation of polymerized resin oils resulting from the acid polymerization of oils derived from carburetted water-gas operation, such as drip oil and water-gas tar distillate fractions, since these oils are particularly subject to formation of products which deleteriously affect the resin product and the distillation equipment during distillation to recover the resin therefrom. The invention is especially applicable to recovery of resin from oil fractions boiling within the range of from 130° C. to 350° C.

We have found that urea and thiourea are surprisingly effective in obviating the harmful effects of the thermally-unstable constituents of acid-polymerized resin oils but, unlike prior art agents, such as soda ash, permit recovery of an improved resin with minimum ash content. Since commercial specifications for resins of the paracoumarone type have strict limitations with respect to ash content, urea and thiourea are particularly valuable treating agents. The invention may be carried into effect, for example by subjecting a resin oil, such as drip oil fractions obtained from drip oil by fractional distillation boiling within the range of from about 130° C. to about 350° C., or fractions from it boiling for example within the range of 130° C. to 230° C. and containing from about 10 to about 30 per cent of resin-forming polymerizable constituents, which constituents include styrene or styrene homologs or both, and may include other polymerizable materials hereinabove recited, to the action of concentrated sulfuric acid polymerization catalyst, separating the acid sludge from the oil, washing it with an aqueous solution of a neutralizing agent, such as aqueous caustic soda, washing and neutralized oil with water and distilling the resultant polymerized resin oil in the presence of urea or thiourea. The distillation may be carried out at atmospheric or subatmospheric pressure, preferably in the presence of live steam. Alternatively, the neutralized polymerized resin oil may be heated, e. g., under reflux, in the presence of urea or thiourea and then distilled to recover the resin.

The amount of urea or thiourea necessary to secure optimum inhibition of the deleterious effects attributed to the break-down of thermal decomposition products and to obtain resin of optimum color and odor and minimum ash content depends on various factors, including the resin content of the polymerized resin oil and source of the resin oil. In general from 0.1 to 1 per cent of agent based on the weight of the polymerized resin oil is sufficient to inhibit development of objectionable color and odor and evolution of undesirable decomposition products during distillation. The optimum amount of agent for each batch of polymerized resin oil may readily be determined prior to addition of the agent by effecting small scale distillations of small portions of the batch with different amounts of the reagents and observing the minimum amount of reagent that produces resin of satisfactory color and odor. The agent may be added as a solid directly to the batch of polymerized oil or it may be added as a solution in a solvent.

The following examples are illustrative of the invention:

Example 1

An oil fraction of drip-oil origin boiling at from about 130° C. to 230° C. and containing about 25% by weight of resin-forming constituents, chiefly styrene, indene and their homologs, was polymerized using concentrated (66° Bé.) sulfuric acid as catalyst, the acid sludge was drawn off, the polymerized resin oil neutralized with aqueous caustic soda solution and then washed with water. After the addition of 0.2% by weight of urea the polymerized oil was distilled at a pressure of 760 mm. of mercury. The resin recovered as residue from the distillation represented 24.2% by weight of the oil charged and had a melting point of 57° C., an ash content of 0.04%, a color of C-10 as measured on the customary resin color scale described below and had a characteristic sweet odor. For purposes of comparison a portion of the polymerized resin oil prepared in connection with the preceding experiment was distilled at a pressure of 760 mm. of mercury without the addition of any urea. The recovered resin had a melting point of 55.75° C., an ash content of 0.04%, a color of C-13 and a sharp (acidic) odor.

A further method of measuring the effectiveness of urea in suppressing the evolution of thermal decomposition products is found in determining the acidity of the distillate recovered in distilling the polymerized resin oil, since the presence of decomposition products is reflected in increased acidity of the distillates. The following tests were made in connection with the two above-described distillations.

The distillates obtained in the two distillations and the contents of hydrogen peroxide traps attached to the receivers in which the distillates were collected were titrated with a 0.2 normal solution of sodium hydroxide. The distillate products recovered in the distillation carried out in the presence of urea were found to be slightly alkaline; the distillate products obtained by distilling the polymerized resin oil without the addition of urea required for neutralization of the acidity present 8.2 ml. of the standard sodium hydroxide solution per hundred grams of the polymerized resin oil subjected to distillation. These tests show clearly that the presence of a small quantity of urea suppresses the evolution of acidic decomposition products.

Example 2

An oil fraction of drip-oil origin boiling at from about 130° C. to 230° C. containing about 20 per cent by weight of resin-forming polymerizable constituents, chiefly styrene, indene and their homologs was polymerized with concentrated (66° Bé.) sulfuric acid, neutralized with aqueous caustic soda solution and then washed with water. After the addition of 0.2% of urea (based on the weight of the oil) the polymerized resin oil was steam distilled at a pressure of 760 mm. of mercury. The resin recovered, representing 19.2% by weight of the charge had a melting point of 49.5° C., an ash content of 0.08%, a color of C-8 and a characteristic sweet odor. The distillate showed no acidity.

The resin colors referred to above refer to designations on a standard color scale described, for example, in U. S. Patent 2,344,676 of March 21, 1944. Extension of the scale as described to include color C-13 is effected as follows:

For resins having a color darker than C-10, 1 cc. of the benzol test solution prepared as described in the aforementioned patent is diluted with 25 cc. of pure benzol, the color of the diluted sample determined in accordance with the standard color scale and the color of the resin then reported as the number of the diluted sample plus 10; thus, if the diluted sample reads C-3, the color of the resin would be reported as C-13.

From the foregoing it will be seen that the invention makes it possible to inhibit or eliminate the harmful effect of thermal decomposition products in the distillation of polymerized resin oils and to recover resins of improved color and odor and with minimum ash content.

Since certain changes may be made in the above described process without departing from the scope of the invention, it is intended that all matter contained in the above description shall be interpreted as illustrative and not in a limiting sense.

We claim:

1. In the recovery of a resin comprising a polymer obtained by sulfuric acid polymerization of at least one compound of the group consisting of indene, coumarone, styrene and their homologs boiling within the range 130° to 350° C., from oil containing such resin and also containing acid- forming impurities introduced by the sulfuric acid polymerization, the improvement which comprises heating the oil in the presence of a compound selected from the group consisting of urea and thiourea, and distilling unpolymerized oil from said resin.

2. In the recovery of a resin comprising a polymer obtained by sulfuric acid polymerization of at least one compound of the group consisting of indene, coumarone, styrene and their homologs boiling within the range 130° to 350° C., from oil containing such resin and also containing acid-forming impurities introduced by the sulfuric acid polymerization, the improvement which comprises neutralizing the oil and distilling unpolymerized oil therefrom in the presence of a compound selected from the group consisting of urea and thiourea.

3. The process of the preceding claim wherein unpolymerized oil is distilled from the neutralized resin-containing oil by steam distillation in the presence of 0.1% to 1% of urea based on the weight of the oil.

4. The process of the preceding claim wherein the neutralizing is effected by means of aqueous caustic soda solution.

5. In the recovery of resin from a resin oil boiling principally in the range 130° to 230° C. and containing as the chief polymerizable constituents styrene, indene and their homologs boiling in said range, said resin having been prepared by a process involving sulfuric acid polymerization of the polymerizable constituents of said resin oil to provide an oil containing polymerization products and acid-forming impurities introduced by said sulfuric acid polymerization, the improvement which comprises neutralizing the oil and steam distilling unpolymerized oil therefrom in the presence of 0.1% to 1% of urea based on the weight of the oil.

6. The process of the preceding claim wherein the neutralizing is effected by means of aqueous caustic soda solution.

HARRY L. ALLEN.
HERBERT G. KLEINGUENTHER.

REFERENCES CITED

The following references are of record in the file of this patent:

UNITED STATES PATENTS

| Number | Name | Date |
| --- | --- | --- |
| 1,360,665 | Miller | Nov. 30, 1920 |
| 2,103,581 | Gray | Dec. 28, 1937 |